United States Patent
Egawa et al.

(10) Patent No.: US 6,180,015 B1
(45) Date of Patent: Jan. 30, 2001

(54) PLASTIC FILTER FOR A PHOTOGRAPH DEVELOPING APPARATUS

(75) Inventors: Yosuke Egawa; Hiroharu Masano, both of Hiratsuka; Kanji Ueyama, Nagahama, all of (JP)

(73) Assignee: Mitsubishi Plastics, Inc., Tokyo (JP)

( * ) Notice: Under 35 U.S.C. 154(b), the term of this patent shall be extended for 0 days.

(21) Appl. No.: 09/086,580

(22) Filed: May 29, 1998

(51) Int. Cl.⁷ ....................................................... B01D 37/00
(52) U.S. Cl. ................. 210/767; 210/497.01; 210/510.1; 210/496
(58) Field of Search ............................ 210/497.01, 510.1, 210/496, 767

(56) References Cited

U.S. PATENT DOCUMENTS

| | | | |
|---|---|---|---|
| 4,778,601 | * | 10/1988 | Lopatin et al. . |
| 4,888,117 | * | 12/1989 | Brown et al. . |
| 5,677,031 | * | 10/1997 | Allan et al . |
| 5,804,074 | * | 9/1998 | Takiguchi et al. . |
| 5,853,633 | * | 12/1998 | Kono et al. . |

FOREIGN PATENT DOCUMENTS 0 743 085   11/1996   (EP) .

OTHER PUBLICATIONS

U.S. application No. 08/643,455, filed May 8, 1996, allowed.
U.S. application No. 09/086,580, filed May 29, 1998, pending.

* cited by examiner

Primary Examiner—Matthew O. Savage
Assistant Examiner—David Sorkin
(74) Attorney, Agent, or Firm—Oblon, Spivak, McClelland, Maier & Neustadt, P.C.

(57) ABSTRACT

A plastic filter for a photograph developing apparatus, which is obtained by sinter-forming a thermoplastic material and which has a porosity of from 30 to 60 vol %, a filtration precision of a level capable of capturing foreign matters of at least 30 $\mu$m, and a pressure loss of at most 20 mmAq at a dry air flow rate of 1 $m^3/m^2 \cdot min$.

6 Claims, No Drawings

PLASTIC FILTER FOR A PHOTOGRAPH DEVELOPING APPARATUS

The present invention relates to a plastic filter for a photograph developing apparatus, particularly a plastic filter for a photograph developing apparatus, which is useful for effectively separating, by filtration, foreign matters in various treating tanks of the photograph developing apparatus.

An automated developing apparatus for developing treatment of photographic sensitive materials such as photographic films or photographic printing papers, comprises treating tanks for treating liquids such as a developing solution, a fixing solution and washing water, transporting means which sequentially pass the photographic sensitive materials to be treated through the respective treating tanks, treating liquid circulating systems connected to the respective treating tanks, and liquid temperature controlling apparatus disposed in the circulating systems.

Such treating liquid circulating systems are provided with pipings and electromagnetic valves for circulating the respective treating liquids by circulating pumps, and they are also provided with filters for photograph-developing apparatus, as filtration means to remove foreign matters, such as various sludges formed by chemical reactions, fine contaminants and scales.

As such a filter, a plastic filter is available which is molded by a so-called sintering method wherein a polyolefin type material such as a low density or high density polyethylene or polypropylene is filled in a mold, and the mold is heated to a level close to the melting point of the resin to fuse only the surface of particles.

However, such a material undergoes an abrupt deterioration of the elastic modulus at a temperature higher than the melting point, and yet no rubber-like flat portion is observed. Accordingly, if the material constituting the filter is fine particles, clogging of the spaces among particles is likely to take place by the Laplace principle, and it will be difficult to control the porosity and the pore diameter.

Accordingly, commercially available plastic filters for photograph developing apparatus are those obtained by sinter-forming materials having relatively large particle sizes. Such plastic filters have had a problem that the pore sizes are large, and fine foreign matters in the treating tanks can not be separated by filtration, and a problem that the production costs tend to be high since the molding method is a batch system.

Further, there has been a filter for a photograph developing apparatus which is prepared by winding non-woven fabrics or yarn fibers on the outer circumference of a cylindrical plastic support. However, such a filter has had a problem that filamentous contaminants are likely to result from itself due to e.g. fuzzing of fibers during its use, thus leading to an increase of foreign matters in the treating tanks.

As a result of extensive studies, the present inventors have found a plastic filter for a photograph developing apparatus having a good filtration precision, which is capable of solving the above problems. Namely, the present invention provides a) plastic filter for a photograph developing apparatus, which is obtained by sinter-forming a thermoplastic material and which has a porosity of from 30 to 60 vol %, a filtration precision of a level capable of capturing foreign matters of at least 30 μm, and a pressure loss of at most 20 mmAq at a dry air flow rate of 1 m$^3$/m$^2$·min, b) the plastic filter for a photograph developing apparatus, wherein the thermoplastic material is an ultrahigh molecular weight polyethylene and it is in the form of a hollow cylinder having a radial crushing strength of at least 5 kg/cm$^2$, and c) the plastic filter for a photograph developing apparatus, wherein the average particle size of the ultrahigh molecular weight polyethylene is from 50 to 700 μm.

Now, the present invention will be described in detail with reference to the preferred embodiments.

The plastic filter for a photograph developing apparatus of the present invention, which is obtained by sinter-forming a thermoplastic material, is required to have a porosity of from 30 to 60 vol %, a filtration precision of a level capable of capturing foreign matters of at least 30 μm, and a pressure loss of at most 20 mmAq at a dry air flow rate of 1 m$^3$/m$^2$·min. Preferably, the thermoplastic material is an ultrahigh molecular weight polyethylene, and the radial crushing strength is at least 5 kg/cm 2. More preferably, the average particle size of the ultrahigh molecular weight polyethylene is from 50 to 700 μm.

The thermoplastic material constituting the plastic filter for a photograph developing apparatus of the present invention, is not particularly limited so long as it is a material having a small melt flow rate and whereby a porous body can relatively easily be obtained, among polyolefin resins such as polyethylene and polypropylene, polyvinyl chloride resins, polyester resins, polyamide resins, polystyrene resins, polyacrylic resins, fluorine resins, etc. Among them, particularly preferred is an ultrahigh molecular weight olyethylene having a melt flow rate (MFR) as small as at most 1.0, preferably at most 0.01, since a rubber-like flat portion is observed in a stress-strain curve within a wide temperature range of at least the melting point, clogging of spaces among particles scarcely takes place, and a plastic film for a photograph developing apparatus, having a uniform pore diameter, can be obtained.

The thermoplastic material is preferably in the form of a powder, and its average particle size may be within a range of from 50 to 700 μm, preferably from 60 to 500 μm, which brings about good results. Namely, if the average particle size is smaller than 50 μm, the filtration precision may be improved, but the pressure loss during passage of a fluid, tends to be high, such being undesirable. If the average particle size exceeds 700 μm, no adequate filtration precision tends to be obtained, such being undesirable.

The porosity of the plastic filter for a photograph developing apparatus of the present invention, is required to be within a range of from 30 to 60 vol %, preferably from 35 to 55 vol %, which brings about good results. Namely, if the porosity is less than 30 vol %, the pressure loss during passage of a fluid, tends to be high, such being practically unsuitable. On the other hand, if the porosity is more than 60 vol %, the mechanical strength tends to be inadequate, for example, the radial crushing strength tends to be small, such being practically unsuitable.

In the present invention, the porosity is calculated by the following formula.

$$\text{Porosity (vol \%)} = [(A-B)/A] \times 100$$

where A is the true density (g/cm 3) of the thermoplastic material constituting the plastic filter, and B is the apparent density (g/cm$^3$) of the plastic filter.

Here, the apparent density B of the plastic filter is obtained by measuring the mass and the volume of a test specimen cut out from the filter, by the respective conventional methods and dividing the mass value (g) by the volume value (cm$^3$). Further, when the filter is of a predetermined shape such as a hollow cylinder, the volume value can be obtained also by measuring its outer diameter, inner diameter and length, so that the volume can be calculated. On the other hand, the true density A of the thermoplastic material constituting the plastic filter can be obtained also by measurement with respect a sample obtained by remelting the filter, followed by cooling for solidification.

The filtration precision of the plastic filter for a photograph developing apparatus of the present invention, is required to be a filtration precision of a level capable of capturing foreign matters of at least 30 μm. Namely, particle sizes of various foreign matters (such as various sludges, fine contaminants and scales) to be removed for the development treatment, are roughly from about 50 to 200 μm except for special foreign matters. On the other hand, pore diameters of the filter obtained by sinter-forming a thermoplastic material have a certain distribution even when the shape and the particle size of the starting material particles are adjusted. If there is a portion where the pore diameters are large, such is not practically useful, since large foreign matters which should be removed as retained on the surface of the filter, may be passed. In other words, it is necessary that the maximum diameter of particles passing through the filter should not exceed 30 μm.

Whether or not a plastic filter has a required filtration precision, can be judged by measuring the maximum size of particles passing through the plastic filter when an air stream containing calcium carbonate particles having different particle sizes, is filtered under a constant condition. In the present invention, the filtration precision is represented by the maximum size of such permeated particles.

As a condition for this measurement, calcium carbonate particles having particle sizes of from 1 to 600 μm are mixed in air at a proportion of 25 g/m$^3$, and the flow rate of air per unit area of the outer surface of the filter is maintained at 1 m$^3$/m$^2$·min in a standard state As the pressure loss of the plastic filter for a photograph developing apparatus of the present invention, the pressure loss at a dry air flow rate of 1 m$^3$/m$^2$·min is required to be at most 20 mmAq, preferably at most 10 mmAq, which brings about good results. If the pressure loss exceeds 20 mmAq, the resistance against the fluid passing through the filter increases, whereby introduction of the fluid at a high flow rate tends to be difficult.

Whether or not the pressure loss of a plastic filter is within the allowable range, can be judged by measuring the pressure difference between the inside and the outside of the filter when clean air containing no foreign matters is passed therethrough under a constant condition. In the present invention, the pressure loss is represented by this pressure difference in terms of the height (mmAq) of water column.

Further, the plastic filter for a photograph developing apparatus of the present invention preferably has an adequate strength against compression stress. With respect to a plastic filter of a hollow cylinder, the radial crushing strength is preferably at least 5 kg/cm$^2$, more preferably at least 10 kg/cm$^2$. If the radial crushing strength is less than 5 kg/cm$^2$, a trouble such as breakage is likely to result.

Thus, in the present invention, the radial crushing strength is calculated by the following formula.

Radial crushing strength (kg/cm2)=P(D−t)/(L×t$^2$)

where P is the breaking load (kg), D is the outer diameter (cm) of the filter, t is the wall thickness (cm) oL the filter, and L is the length (cm) of the filter.

Here, the breaking load P is the maximum load (kg) until a test specimen breaks by compression. The test specimen had a length of 1 cm, and the compression load was exerted at a constant rate in a direction perpendicular to the center axis of the cylinder as the test specimen.

The sinter-forming method of the plastic filter for a photograph developing apparatus of the present invention is not particularly limited, and is usually carried out by a so-called in-mold sintering method. Namely, not only a static forming method wherein a forming mold comprising an outer mold having an inner surface shape of e.g. a cylinder and an inner mold having a similar outer surface shape inserted in the outer mold, is employed, and a thermoplastic material is filled in a cavity formed at the space between the inner surface of the outer mold and the outer surface of the inner mold, followed by heating it together with the forming mold, but also a dynamic forming method may be employed, such as (1) a ram extrusion method using a ram extruder having a piston (or a plunger) build-in to reciprocate in a cylinder which has a forming die at the forward end and the temperature of which is adjustable, (2) an injection molding method using an injection molding machine having a screw build-in within a cylinder which has a forming die at its forward end and the temperature of which is adjustable, or (3) an extrusion molding method using an extrusion molding machine having a screw build-in within a cylinder which has a forming die at its forward end and the temperature of which is adjustable.

Among these static and dynamic forming methods, a suitable one may be selected for use depending upon the requirements such as the shape of the final porous body. However, from the viewpoint of the production costs and the production efficiency, the ram extrusion method which is carried out by using a ram extruder having a piston build-in within a cylinder, or an extrusion molding method which is carried out by using an extrusion molding machine having a screw build-in within a cylinder, is preferred, since the plastic filters can be formed continuously.

Now, the present invention will be described in further detail with reference to Examples. However, it should be understood that the present invention is by no means restricted to such specific Examples.

In the following Examples and Comparative Examples, the tests for various properties and performance of the plastic filters for photograph developing apparatus were carried out by the following methods, and the results are shown.

(1) Porosity

The porosity is obtained by the following formula:

Porosity (vol %)=[(A−B)/A]×100 where A is the true density (g/cm$^3$) of the constituting plastic material, and B is the apparent density (g/cm3) of the plastic filter.

For this purpose, a test specimen having a volume of about 20 cm$^3$ is taken out from a plastic filter, and the mass of the test specimen is measured by means of a weighing instrument, whereupon the apparent density B is obtained by the following formula.

Apparent density B=mass of the test specimen (g)/volume of the test specimen (cm$^3$)

(2) Filtration precision

In a container comprising a particle-containing air chamber containing calcium carbonate particles on one side and a separated air chamber connected to a vacuum pump on the other side, a hollow cylindrical plastic filter having an inner diameter of 17.0 mm, an outer diameter of 24.0 mm and a length of 143 mm, is disposed so that one opening is closed and the other opening is located in the separated air chamber. While supplying an air containing 25 g/m$^3$ of suspended calcium carbonate particles having particle sizes of from 1 to 600 μm, the air in the container is suctioned by a vacuum pump at a rate of 1 m³/m²·min (at a temperature of 23° C. under a pressure of 1 atm). At that time, calcium carbonate particles in the separated air chamber, which have passed from the outer surface to the inside of the filter, are collected, and the maximum particle size thereof is measured and taken as the filtration precision.

(3) Pressure loss

With respect to a plastic filter of a hollow cylinder, a manometer is attached to one opening of the hollow cylinder, and a vacuum pump is attached to the other opening, and the vacuum pump is operated to suction so that the air will be at a predetermined flow rate (1 m³/min; temperature: 23° C.; pressure: 1 atm) per the outer surface area (1 m) of the filter, whereby the pressure difference is measured and taken as the pressure loss (mmAq).

(4) Radial crushing strength

A test specimen having a length of 1 cm is taken from a hollow cylindrical plastic filter, and this test specimen is sandwiched between a pair of flat plates by means of a compression testing machine and compressed at a rate of 2 mm/min in a direction perpendicular to the center axis of the test specimen cylinder, whereby the breaking load of the test specimen is measured, and the radial crushing strength is obtained by the following formula.

$$\text{Radial crushing strength (kg/cm}^2\text{)} = P(D-t)/(L \times t^2)$$

P: Breaking load (kg)
D: Outer diameter of the filter (cm)
t: Wall thickness of the filter (cm)
L: Length of the filter (cm)

(5) Performance test

A plastic filter was mounted in each treating tank of an automatic developing apparatus, and the apparatus was actually operated for 2 weeks, and the contamination state of the liquid in each tank, the captured state of foreign matters on the filter surface and the change in the amount of the treated liquid passing through the filter were observed and evaluated. The results are represented by symbol ◯ which indicates no abnormality, and symbol X which indicates abnormality.

EXAMPLE 1

An ultrahigh molecular weight polyethylene having an average particle size of 400 μm, a MFR of at most 0.01 and a molecular weight of 6,000,000, was extruded by a ram extruder provided at its forward end with a mouthpiece having a cylindrical opening so that the outer diameter of a plastic filter would be 24.0 mm and the inner diameter thereof would be 17.0 mm, and mutual fusion of the melt dispersed particles was carried out by the mouthpiece, to obtain a plastic filter for a photograph developing apparatus.

EXAMPLE 2

An ultrahigh molecular weight polyethylene having an average particle size of 400 μm, a MFR of at most 0.01 and a molecular weight of 6,000,000, was extruded by an opposite directional twin screw conical extruder provided at its forward end with a mouthpiece having a cylindrical opening so that the outer diameter of a plastic filter would be 24.0 mm and the inner diameter thereof would be 17.0 mm, and mutual fusion of the melt dispersed particles was carried out by the mouthpiece, to obtain a plastic filter for a photograph developing apparatus.

EXAMPLE 3

An ultrahigh molecular weight polyethylene having an average particle size of 160 μm, a MFR of at most 0.01 and a molecular weight of 6,000,000, was extruded by an opposite directional twin screw conical extruder provided at its forward end with a mouthpiece having a cylindrical opening so that the outer diameter of a plastic filter would be 24.0 mm and the inner diameter thereof would be 17.0 mm, and mutual fusion of the melt dispersed particles was carried out by the mouthpiece, to obtain a plastic filter for a photograph developing apparatus.

COMPARATIVE EXAMPLE 1

As a forming mold, an inner mold having a cylindrical outer surface and an outer mold having a cylindrical inner surface were prepared. The outer diameter of the inner mold was smaller by 7 mm than the inner diameter of the outer mold. Firstly, the inner mold is inserted in the outer mold and disposed so that a space of 3.5 mm was uniformly formed between the outer mold and the inner mold. Then, into that space, an ultrahigh molecular polyethylene having an average particle size of 800 μm, a MFR of at most 0.01 and a molecular weight of 4,000,000, was filled, and this polyethylene was heated and sinter-formed for 30 minutes in a heating furnace at a temperature of from 160 to 200° C., to obtain a plastic filter for a photograph developing apparatus, which had an outer diameter of 24.0 mm and an inner diameter of 17.0 mm.

COMPARATIVE EXAMPLE 2

Using the same forming mold as used in Comparative Example 1, an ultrahigh molecular weight polyethylene having an average particle size of 30 μm, a MFR of at most 0.01 and a molecular weight of 4,000,000, was filled into the space of 3.5 mm between the outer mold and the inner mold, and this polyethylene was heated and sinter-formed for 30 minutes in a heating furnace at a temperature of from 160 to 200° C., to obtain a plastic filter for a photograph developing apparatus, which had an outer diameter of 24.0 mm and an inner diameter of 17.0 mm.

COMPARATIVE EXAMPLE 3

Using the same forming mold as used in Comparative Example 1, a low density polyethylene having an average particle size of 1,000 μm, a MFR of 6.0 and a molecular weight of 50,000, was filled into the space of 3.5 mm between the outer mold and the inner mold, and this polyethylene was heated and sinter-formed for 30 minutes in a heating furnace at a temperature of 160° C., to obtain a plastic filter for a photograph developing apparatus, which had an outer diameter of 24.0 mm and an inner diameter of 17.0 mm.

COMPARATIVE EXAMPLE 4

Using the same forming mold as used in Comparative Example 1, a low density polyethylene having an average particle size of 100 μm, a MFR of 10.0 and a molecular weight of 40,000, was filled into the space of 3.5 mm between the outer mold and the inner mold, and this polyethylene was heated and sinter-formed for 30 minutes in a heating furnace at a temperature of 160° C., but no pores could be formed, and a desired filter was not obtained.

TABLE 1

| Properties (units) | Example 1 | Example 2 | Example 3 | Comparative Example 1 | Comparative Example 2 | Comparative Example 3 |
|---|---|---|---|---|---|---|
| Porosity (%) | 40 | 42 | 38 | 45 | 33 | 40 |
| Filtration precision ($\mu$m) | 20 | 20 | 10 | 80 | 4 | 100 |
| Pressure loss (mmAq) | 3 | 3 | 8 | 1 | 35 | 0.2 |
| Radial crushing strength (kg/cm$^2$) | 25 | 30 | 40 | 20 | 100 | 45 |
| Performance test | ◯ | ◯ | ◯ | X | X | X |

As shown in Table 1, with the plastic filters of Examples 1 to 3, the filtration precision was not higher than 30 $\mu$m, and in the actual performance tests, foreign matters were efficiency captured by the filter surface, and the liquids in the treating tanks were maintained to be clean.

Further, no decrease in the amount of the treated liquid passed through each filter was observed, and the plastic filters of Examples 1 to 3 maintained a sufficiently low pressure loss of not higher than 20 mmAq.

Whereas, with the plastic filters of Comparative Examples 1 to 3, the filtration precision was 80 $\mu$m, and 100 $\mu$m, respectively, and foreign matters in the treating tanks were not adequately captured. 100 cc of the liquid in each treating tank was taken and visually inspected, whereby substantial foreign matters were observed as suspended.

Further, the plastic filter of Comparative Example 2 had a high pressure loss, whereby circulation of the treated liquid in the tank was poor, and the amount of the treated liquid passed through the filter was low. Consequently, an abnormal trouble was observed such that the temperature in the treating tank rose.

Further, in Comparative Example 4, spaces among the particles were closed in the mold during the sinter-forming, whereby a porous body was not obtained.

As described in the foregoing, the plastic filter for a photograph developing apparatus of the present invention has a porosity of from 30 to 60 vol %, a filtration precision of a level capable of capturing foreign matters of at least 30 $\mu$m and a pressure loss of at most 20 mmAq at a dry air flow rate of 1 m$^3$/m$^2$·min, whereby in spite of the small pressure loss, the filtration precision is high, and foreign matters in a treating tank can efficiency be separated by filtration.

Accordingly, it is useful as a filter for a photograph developing apparatus.

We claim:

1. A plastic filter for a photograph developing apparatus, which is obtained by sinter-forming an ultrahigh molecular weight polyethylene and which has a porosity of from 30 to 60 vol %, a filtration precision of a level capable of capturing foreign matters of at least 30 $\mu$m, and a pressure loss of at most 20 mmAq at a dry air flow rate of 1 m$^3$/m$^2$·min, said plastic filter being in the form of a hollow cylinder having a radial crushing strength of at least 5 kg/cm$^2$.

2. The plastic filter for a photograph developing apparatus according to claim 1, wherein the average particle size of the ultrahigh molecular weight polyethylene is from 50 $\mu$m to 700 $\mu$m.

3. The plastic filter for a photograph developing apparatus according to claim 1, wherein the average particle size of the ultrahigh molecular weight polyethylene is from 160 $\mu$m to 400 $\mu$m.

4. A method for effectively separating foreign matters in a treating liquid of a photograph developing apparatus, comprising passing said treating liquid through a plastic filter according to claim 1.

5. A method for effectively separating foreign matters in a treating liquid of a photograph developing apparatus, comprising passing said treating liquid through a plastic filter according to claim 2.

6. A method for effectively separating foreign matters in a treating liquid of a photograph developing apparatus, comprising passing said treating liquid through a plastic filter according to claim 3.

* * * * *